US006943828B1

(12) United States Patent
Grimes et al.

(10) Patent No.: US 6,943,828 B1
(45) Date of Patent: Sep. 13, 2005

(54) METHOD AND APPARATUS FOR PROVIDING ADAPTIVE HORIZONTAL SYNC DETECTION

(75) Inventors: Kevin Lloyd Grimes, Fishers, IN (US); Roderick Andre Watts, Indianapolis, IN (US); Andrew Kent Flickner, Carmel, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 443 days.

(21) Appl. No.: 10/049,451

(22) PCT Filed: Aug. 17, 2000

(86) PCT No.: PCT/US00/22472

§ 371 (c)(1),
(2), (4) Date: Feb. 12, 2002

(87) PCT Pub. No.: WO01/13626

PCT Pub. Date: Feb. 22, 2001

Related U.S. Application Data

(60) Provisional application No. 60/149,297, filed on Aug. 17, 1999.

(51) Int. Cl.$^7$ ............................ H04N 17/02; H03L 7/00
(52) U.S. Cl. ........................ 348/194; 348/540; 348/558
(58) Field of Search ................................. 348/194, 180, 348/558, 540, 542, 531, 532; 725/17

(56) References Cited

U.S. PATENT DOCUMENTS

| 5,335,010 | A | * | 8/1994 | Lindemeier et al. | ........ 348/706 |
| 5,617,137 | A | * | 4/1997 | Whitlow | ..................... 348/193 |
| 5,835,155 | A | | 11/1998 | Jennes et al. | ............... 348/536 |
| 5,867,222 | A | * | 2/1999 | Norris et al. | ............... 348/528 |
| 6,621,523 | B2 | * | 9/2003 | Obitsu | ........................ 348/552 |

FOREIGN PATENT DOCUMENTS

EP          0810784        12/1997        ............ H04N 5/46

* cited by examiner

Primary Examiner—Victor R. Kostak
(74) Attorney, Agent, or Firm—Joseph S. Tripoli; Robert D. Shedd; Paul P. Kiel

(57) ABSTRACT

A method and apparatus for providing adaptive horizontal synchronization (sync) signal detection to identify whether a high quality television signal is being received by a television set. The method determines whether no signal is applied, whether a weak signal is applied or a strong signal is applied to the television set by sampling and processing the horizontal synchronization signal. The signals are classified by comparing the sample horizontal synchronization signals to a predefined threshold. The threshold is established based upon the type of source that produced the television signal.

15 Claims, 5 Drawing Sheets

US 6,943,828 B1

METHOD AND APPARATUS FOR PROVIDING ADAPTIVE HORIZONTAL SYNC DETECTION

This application claims the benefit under 35 U.S.C. § 365 of International Application PCT/US00//22472, filed Aug. 17, 2000, which was published in accordance with PCT Article 21(2) on Feb. 22, 2001 in English; and which claims benefit of U.S. provisional application Ser. No. 60/149,297 filed Aug. 17, 1999.

FIELD OF THE INVENTION

The present invention relates to an apparatus and a method for processing television signals, and more particularly, to a method and apparatus for providing adaptive horizontal synchronization (horizontal sync) signal detection.

DESCRIPTION OF THE RELATED ART

Modern television sets generally attempt to demodulate and display detected video signals that are undegraded and of sufficient quality that can provide an acceptable picture. As such, a television set must detect either the lack of a television signal or a degraded television signal that would provide a distorted picture, and then hide the poor or nonexistent picture from the viewer. A television set should also notify the user when the television signal is not present, degraded or not connected to the television.

To determine the presence of a usable television signal, a television set generally samples the input signal to determine the presence of a signal, or signal component, that would exist only if a television signal was being received by the television. One such signal is the horizontal synchronization signal (or horizontal sync) that is generated for each line in a video field. If a television set detects a horizontal sync signal, the television set may assume that a television signal is present at the input of the television set. If the amplitude of the horizontal sync signal is above a predetermined threshold level the television set can assume that the received television signal is of sufficient quality to produce acceptable picture.

The circuitry for sampling the horizontal sync signal generally comprises an analog-to-digital (A/D) converter (a video signal digitizer) the output of which is periodically sampled, in an asynchronous manner, to determine the amplitude of the horizontal sync signal. The digitized horizontal sync signal is coupled to a microprocessor via an IIC bus to provide to the microprocessor a sample of the horizontal sync signal. Since the sampling is periodically accomplished without regard to the timing of the video fields and the picture, the detection status samples can be spurious in that the horizontal sync status may be read as being valid on one occasion and invalid on another occasion depending on the location of the sample in the video field. For example, if the status is read at the top of a video field, the horizontal sync signal may be read as being invalid. However, if the status is read again a few microseconds later at a lower point in the same video field, then the horizontal sync status may be read as being valid. In such an arrangement, the television set cannot distinguish an invalid horizontal sync signal from a valid horizontal sync signal based on a single sample. If a television set uses such erroneous data, the television set may erroneously determine that a picture will be of poor quality and blank the picture screen even though the video signal was of sufficient quality to produce an accurate picture. Furthermore, the behavior of the horizontal sync status varies depending on the signal source, i.e., whether the source is cable television, terrestrial antenna, or a VCR playback signal.

SUMMARY OF THE INVENTION

Therefore, a need exists in the art for a method and apparatus for providing adaptive horizontal sync detection to accurately determine whether a television signal of sufficient quality is being received by a television set.

The present invention provides a method and an apparatus for providing adaptive horizontal sync detection to identify whether a television signal of sufficient quality is being received by a television set.

The invention determines whether no signal is being applied, whether a weak signal is being applied or a strong signal is being applied to a television set. The invention recognizes and accommodates certain anomalous behaviors of television sets that interfere with the normal detection of the horizontal sync signal. For example, the invention delays the horizontal sync sampling process for a predefined period of time after a channel change event has occurred to ensure that the signal is sampled at an appropriate time. Generally, channel changes will interfere with the horizontal sync signal for a short time after the channel change has occurred. By delaying the sampling of the horizontal sync signal, the detection circuitry avoids erroneous signal processing.

In addition, after every invalid horizontal sync signal is detected, the circuitry waits for 10 milliseconds and performs a second signal status reading to determine whether the horizontal sync signal becomes valid. This delayed double reading is especially important when the television signal source is a video cassette recorder (VCR). The amount of error that is allowed before the system deems the television signal to be poor is associated with the playback source of television signal, i.e., a VCR or digital versatile disk (DVD) player, will have a higher error tolerance than an over the air television station. Once the sync signal is processed, the user is notified whether the television signal is poor or whether no signal at all is detected. Notification is generally accomplished by blanking the video screen and providing a text message on the screen notifying the user of the weak signal.

An apparatus for processing a television signal according to the present invention comprises: a tuner for receiving a television signal; a signal processor for extracting a horizontal synchronization signal from the television signal; and a horizontal synchronization signal detector for sampling the horizontal synchronization signal, characterized by a horizontal synchronization signal processor, coupled to the horizontal synchronization signal detector, for adaptively processing the horizontal synchronization signal in response to the signal source type to determine the quality of the television signal.

A method of processing a television signal according to the present invention comprises the steps of: receiving a television signal; sampling a horizontal synchronization signal at a first location in a video field of the television signal; and processing the sample to determine a quality measure of the television signal using a predefined threshold, characterized in that the threshold is established in response to a type of source of the television signal, if the quality measure is less than a predefined threshold, re-sampling the horizontal synchronization signal at a second location in the video field, and processing the sample to determine a second quality measure of the television signal.

BRIEF DESCRIPTION OF THE DRAWINGS

The present invention is described in detail with reference to the accompanying drawings, wherein.

To facilitate understanding, identical reference numerals have been used, where possible, to designate identical elements that are common to the figures.

DETAILED DESCRIPTION OF THE INVENTION

Figure 1:
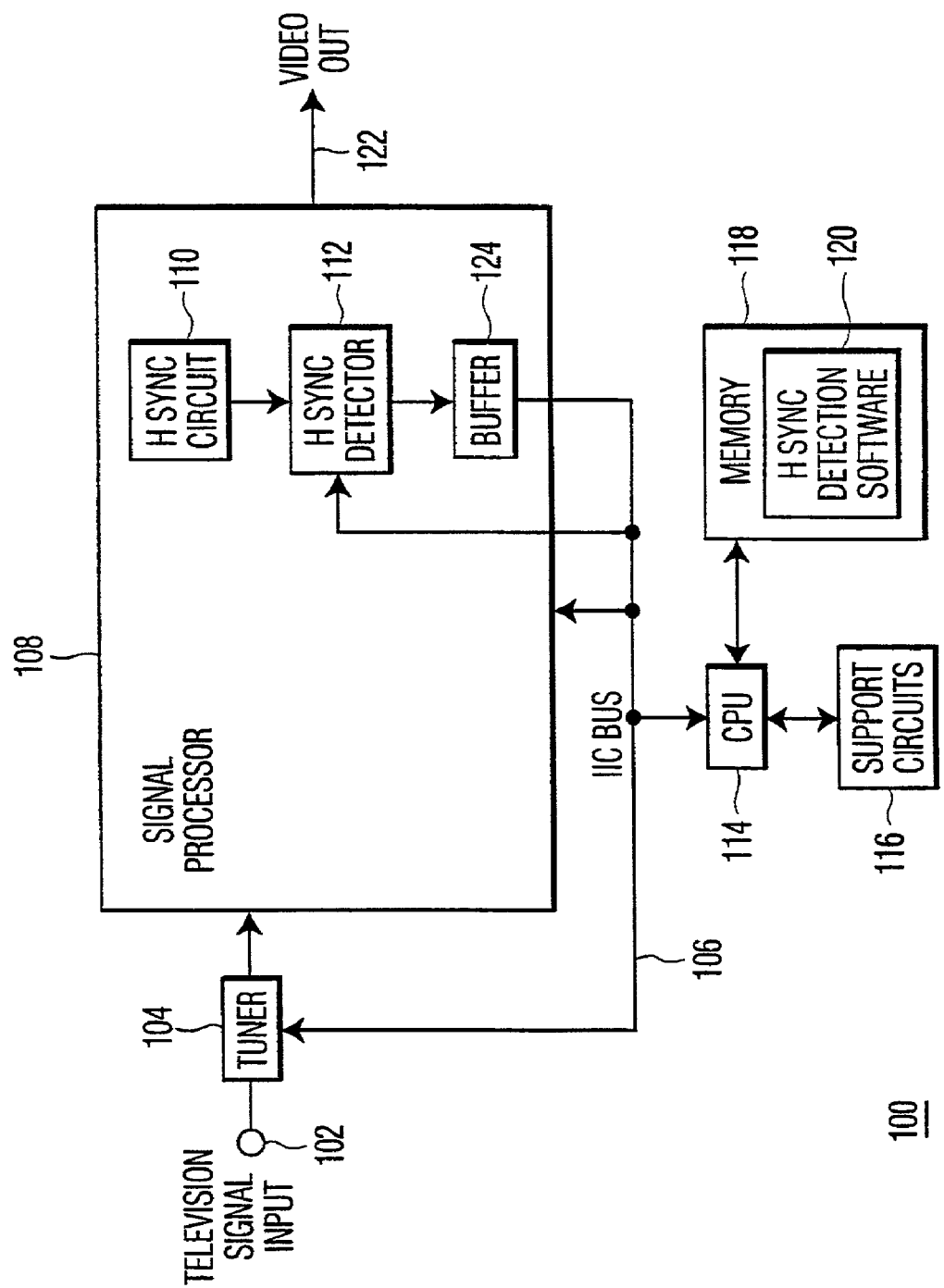
FIG. 1 depicts a block diagram of a television apparatus in accordance with the present invention.

FIG. 1 depicts a block diagram of television apparatus 100 for processing television signals in accordance with the present invention. Television apparatus 100 receives an input signal at terminal 102 and provides a video output for display at terminal 122. Television apparatus 100 comprises tuner 104, signal processor 108, central processing unit 114, support circuits 116 and memory 118.

Tuner 104 selects a particular channel within a frequency band for processing by signal processor 108. Tuner 104 operates in a conventional manner well known by those skilled in the art. The intermediate frequency signal produced by tuner 104 is coupled to signal processor 108 for further processing to extract the video signal from the received television signal. Signal processor 108 contains many well-known circuits for demodulating and decoding a video signal. Within signal processor 108 is horizontal sync circuit 110 that extracts the horizontal sync signal from the television signal.

Television apparatus 100 according to the present invention also includes horizontal sync signal detector 112 that is coupled to horizontal sync circuit 110. Generally, horizontal sync detector 112 is an analog-to-digital converter that samples the horizontal sync signal. The sampling occurs in response to a triggering signal from CPU 114. When triggered, horizontal sync detector 112 writes the sample value to buffer 124. The signal that triggers horizontal sync detector 112 is coupled from CPU 114 to horizontal sync signal detector 112 through IIC bus 106. The sampled amplitude of the horizontal sync signal is digitized by horizontal sync signal detector 112, stored in a buffer that is coupled to IIC bus 106 and, ultimately, the sample is propagated to CPU 114.

CPU 114 is a general purpose microprocessor that is supported by support circuits 116 and memory 118. Support circuits 116 are well known circuits such as cache, clock circuits, input/output driver circuits, power supplies and the like. Memory 118 comprises read only memory and/or random access memory. Memory 118 stores horizontal sync detection software 120 that causes television apparatus 100 to operate in accordance with the present invention. When executing horizontal sync detection software 120, CPU 114 operates as a horizontal sync signal processor.

Horizontal sync signal detection software 120 controls horizontal sync detector 112 to timely sample the horizontal sync signal and then process the digitized signal to determine if the television signal is of sufficient quality to produce an appropriate video picture. Generally, the software classifies the quality of the video signal as viewable; weak, but viewable; and faulty. For viewable and weak signals, the video is displayed. For faulty signals, the video is not displayed and an error message is displayed. Details of the operation of software 120 are discussed below with respect to FIGS. 2 and 3.

Figure 2:
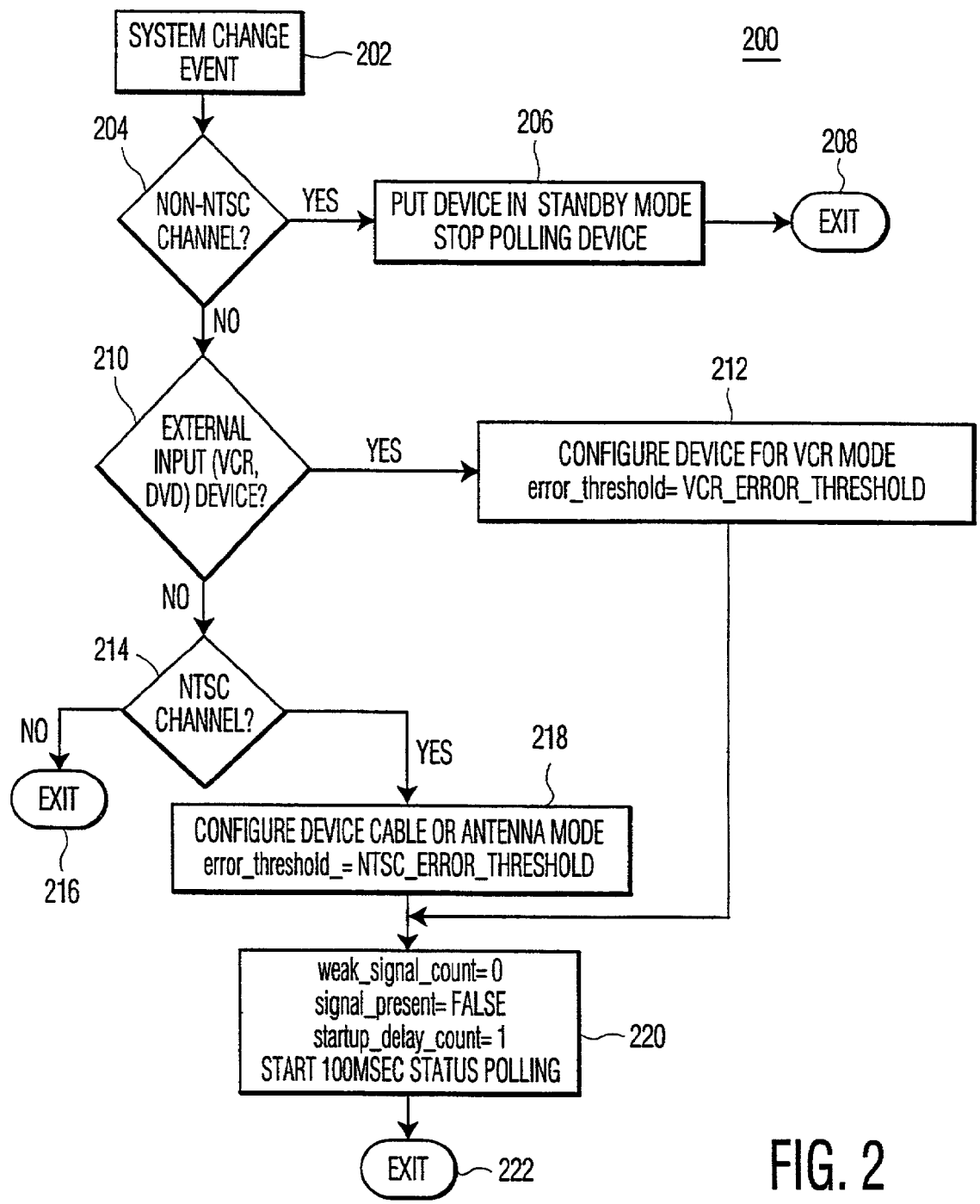
FIG. 2 depicts a flow diagram of a method of processing system change events in accordance with the present invention.
Figure 3:
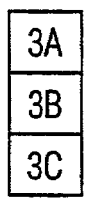
FIGS. 3A, 3B and 3C together depict a flow diagram of a method of performing status polling in accordance with the present invention.

FIG. 2 depicts a block diagram of interrupt routine 200 that is executed by CPU 114 when a system change event has occurred, such as when television tuner 104 has selected a new channel, television apparatus 100 has just been activated, the source of the television signal has been changed, and the like. Interrupt routine 200 begins upon the detection of a system change event at step 202 and proceeds to step 204. At step 204, routine 200 determines whether the selected channel is a non-NTSC channel (i.e., a non-analog television channel). If the channel is not an NTSC channel, the routine proceeds to step 206 where horizontal sync signal detector 112 (the device) is placed in a standby mode and CPU 114 ceases polling horizontal sync signal detector 112. The routine is exited at step 208.

If the query at step 204 is negatively answered, routine 200 proceeds to step 210 where routine 200 queries whether the television signal source is an external device. If the signal source is not an external device, routine 200 proceeds to step 214 where the routine queries whether the television signal source is an NTSC channel. If the query at step 214 is negatively answered, routine 200 proceeds to exit step 216 and stops. If the query at step 214 is affirmatively answered, routine 200 proceeds to step 218 where horizontal sync detector 112 is configured for cable or antenna mode, i.e., for reception of an NTSC channel. In the cable or antenna mode, the error threshold is set to a threshold commensurate with the error received in an NTSC signal having an appropriate signal level for proper detection and display.

If at step 210, an external input source such as a video playback device, e.g., digital video disk (DVD) or video cassette recorder (VCR), is the source of the television signal, routine 200 proceeds to step 212 where horizontal sync signal detector 112 is configured for "VCR" mode. In the VCR mode, the error threshold is set to a level that is commensurate with a VCR signal that is detected and displayed properly. Generally, the current threshold for the NTSC signal is less than the error threshold for the VCR signal. However, in some instances, for example, when the VCR tape is worn or the VCR is in a fast forward or rewind mode, the threshold may be set to a lower level because the horizontal sync signal is distorted, yet the viewer may wish to see the image. The threshold levels may be set based on any appropriate method for determining the desired threshold levels, including, but not limited to, empirical testing and adjusting based on component specifications.

As such, the television apparatus according to the present invention may utilize multiple threshold values to classify the video signals. From either steps 212 or 218, routine 200 proceeds to step 220. At step 220, a plurality of variables are set, including a weak signal count is set to 0, signal present is set to false, startup delay count is set to 1 and the start 100 millisecond status polling is begun such that horizontal sync detector 112 will be polled for a horizontal sync amplitude every 100 milliseconds by CPU 114. Routine 200 is then exited at step 222. Routine 200 then waits until another system change event has occurred. Meanwhile, buffer 124 of horizontal sync signal detector 112 will be polled every 100 milliseconds until the next change event occurs.

Figure 3A:
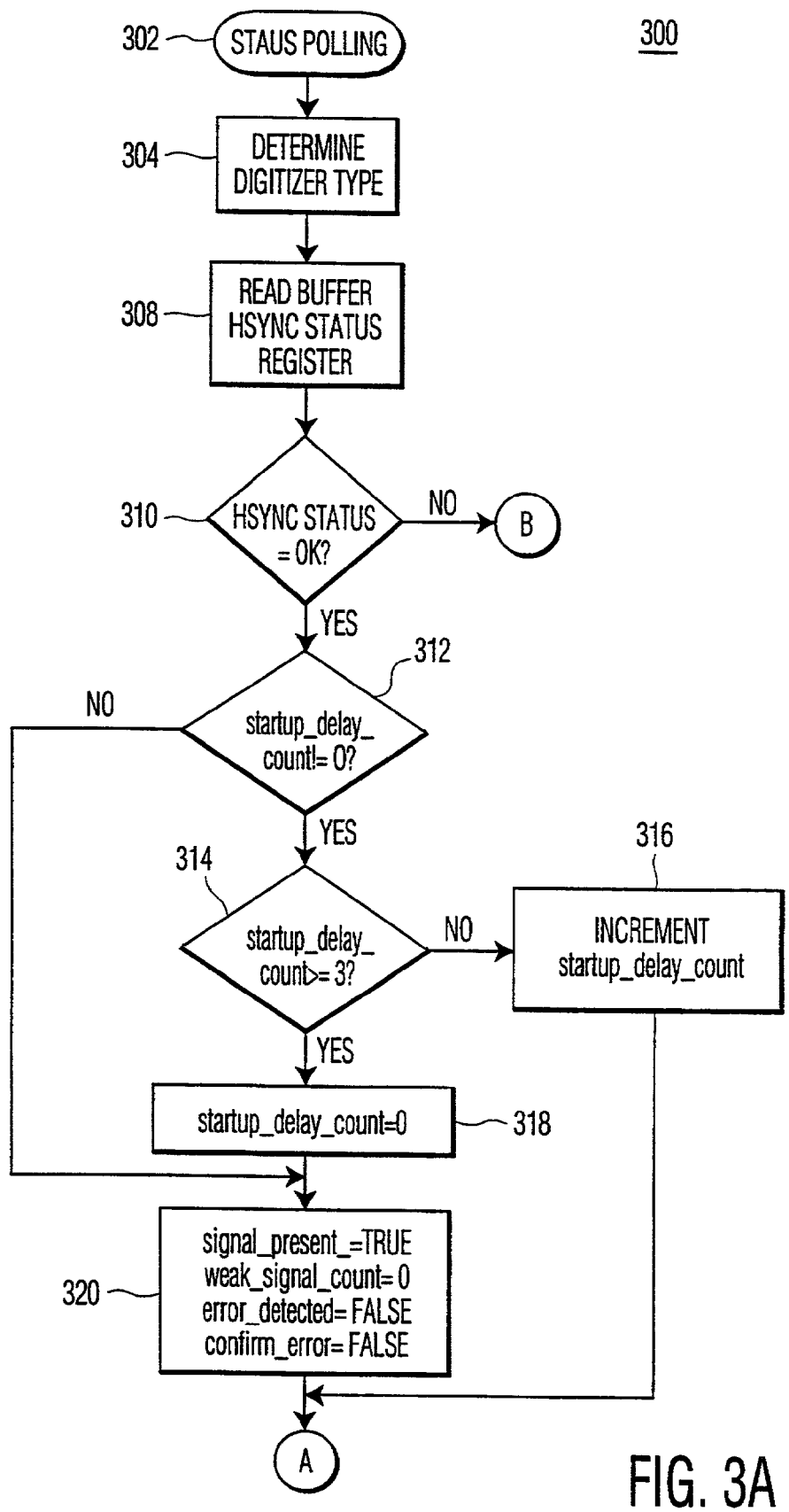
Figure 3B:
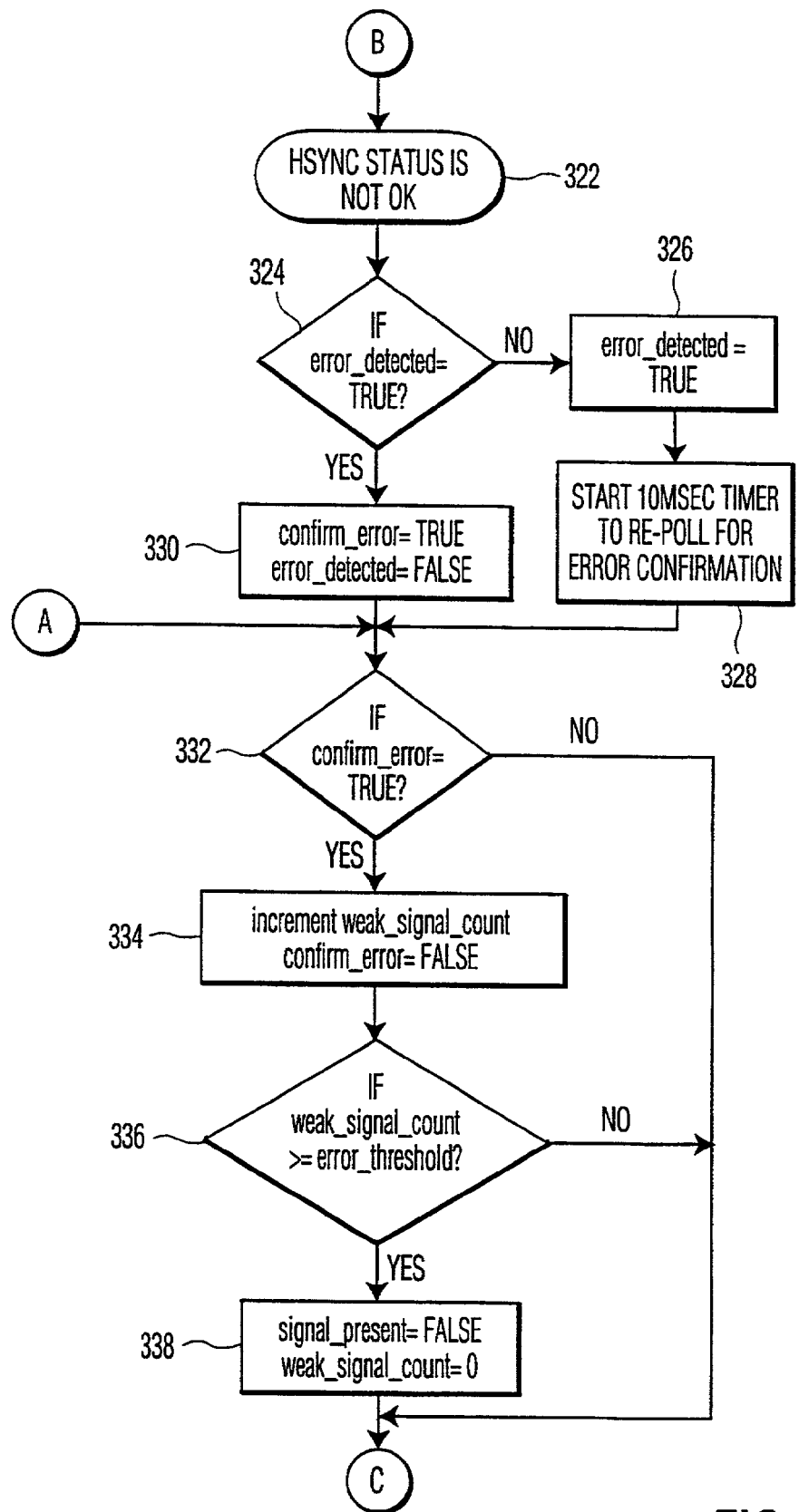
Figure 3C:
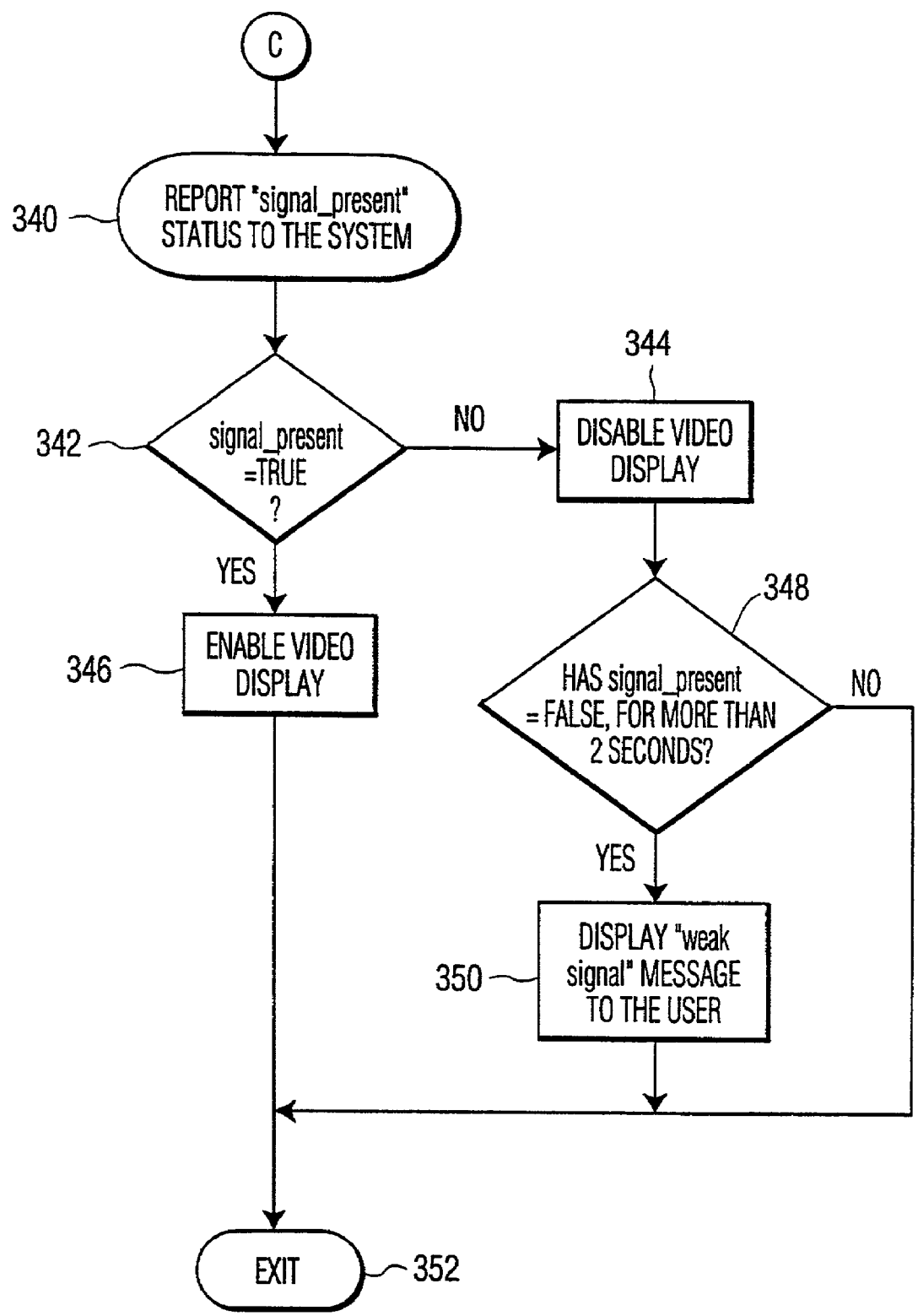

FIGS. 3A, 3B and 3C depict a flow diagram of the horizontal sync detector status polling routine 300. Routine 300 is executed every 100 milliseconds. Status polling routine 300 begins at step 302 and proceeds to step 304. At step 304, routine 300 determines the type of video signal digitizer that is used in signal processor 108. Specifically, the routine checks an EEPROM containing the model number of the television set. From the model number, the routine derives the type of video signal digitizer. The parameters such as delays and threshold values may vary depending upon the accuracy of the digitizer. Thus, to create a versatile routine, routine 300 only sets the variables after confirming the digitizer type. The values used below are typical values.

Routine 300 is designed to operate with buffer 124 for horizontal sync detector 112. Buffer 124 (also referred to as a status register) stores the samples of the horizontal sync signal that is sampled once in each of the video fields. In step 308, buffer 124 is read. At step 310, the horizontal sync status is queried as to whether the status is "OK" or not, i.e., whether the amplitude of the horizontal sync signal sufficient to deem that a television signal is present and of sufficient quality for display. If the answer to query 310 is negative, routine 300 proceeds to "B" in FIG. 3B. If the query at step 310 is affirmatively answered, routine 300 proceeds to step 312.

At step 312, routine 300 queries whether the startup delay count is equal to zero. If the startup delay count is not equal to zero, routine 300 proceeds to step 320. If the query at step 312 is affirmatively answered, routine 300 proceeds to step 314. At step 314, routine 300 queries whether the startup delay count is greater than or equal to 3. The value "3" is equivalent to 300 milliseconds i.e., three horizontal sync samples must be measured after channel change or source change before the "signal-present" variable is set to true. The value is empirically selected to provide a user friendly response to channel changes, i.e., the wait duration is selected to allow system transients to settle. If the query at step 314 is negatively answered, routine 300 proceeds to step 316 where the startup delay is implemented by one and routine 300 proceeds to "A". If the query at step 314 is affirmatively answered, routine 300 proceeds to step 318 wherein the startup delay count is set to zero. Thereafter, a plurality of variables are set at step 320. Specifically, "signal_present" is set to true, "weak_signal" count is set to zero, "error_detector" is set to false, and "confirm_error" is set to false. Routine 300 then proceeds to "A" in FIG. 3B.

At step 322, the horizontal sync status is deemed erroneous due to an error in the sample of the horizontal sync status register. At step 324, routine 300 queries if the error detected is true. If the query at step 324 is negatively answered, routine 300 proceeds to step 326 where the variable query detected is set to true and, at step 328, the 10 millisecond timer is set to re-poll for error confirmation. As such, once the status polling has been completed and an error has been detected, the status registers will be re-polled after 10 milliseconds to ensure that the status error was not caused by an error in reading the horizontal sync signal. As such, if the error in the horizontal sync signal was caused by a line being sampled early in the video field, the ten millisecond timer will re-poll the register and measure the horizontal sync signal later in the video field.

If, at step 324, the query was affirmatively answered, routine 300 proceeds to step 330. At step 330, the variable confirmed error is set to true and the error detected variable is set to false. At step 332, the routine queries if confirm error is set to true. If "confirm_error" is not set to true, then the routine proceeds to step 340 in FIG. 3C. If the query at step 332 is affirmatively answered, the routine proceeds to step 334 where the "weak_signal" count is incremented by one and the "confirm_error" variable is set to false. At step 336, routine 300 queries whether the "weak_signal_count is greater than or equal to the error threshold. The error threshold was previously set depending upon the type of source of the television signal, e.g., over the air versus playback device. If the query at step 336 is negatively answered, routine 300 proceeds to FIG. 3C. However, if the query at step 336 is affirmatively answered, the variable "signal_present" is set to false and "weak_signal_count" is set to zero.

At step 340, the "signal_present" variable is reported to the system on whether a television signal is present or not. At step 342, the "signal_present" query is initiated to determine whether the "signal_present" variable is set to true or not. If the query at step 342 is affirmatively answered, an appropriate and proper television signal is deemed present and, at step 346, the video display is enabled. If the query at step 342 is negatively answered, routine 300 proceeds to step 344 where the video display is disabled because a television signal is not available for display. At step 348, routine 300 queries whether the "signal_present variables" has been false for more than two second. If the query is negatively answered, routine 300 proceeds to step 352 and exits. If the query is affirmatively answered, routine 300 proceeds to step 350 where a weak signal message is displayed on the display to the user. As such, the combination of steps 348 and 350 cause a weak signal display only after a weak signal has occurred for more than two seconds such that false weak signal displays are avoided. Routine 300 ends on step 352.

Although various embodiments which incorporate the teachings of the present invention have been shown and described in detail herein, it is to be understood that those skilled in the art can readily devise many other varied embodiments that still incorporate these teachings.

What is claimed is:

1. Apparatus for processing a television signal, comprising:
   a signal input for receiving a television signal from one of a plurality of signal source types, each of the plurality of signal source types being associated with a respective signal source and providing respective television signals;
   a tuner coupled to the signal input;
   a signal processor, coupled to the tuner, for extracting a horizontal synchronization signal from the received television signal; and
   a horizontal synchronization signal detector for sampling the horizontal synchronization signal; and
   a horizontal synchronization signal processor, coupled to the horizontal synchronization signal detector, for processing the horizontal synchronization signal to determine a quality measure of the received television signal, and enabling or disabling the display of the received television signal in response to the quality measure, wherein
   the horizontal synchronization signal processor adaptively processes the horizontal synchronization signal to determine a quality measure of the received television signal by comparing the amplitude of the horizontal synchronization signal with a threshold amplitude level established in response to the signal source type of the received television signal and generating a display signal in response to the determined quality measure.

2. The apparatus of claim 1, wherein the signal source type comprises one of cable, antenna, and video playback device.

3. The apparatus of claim 2, wherein
if the amplitude of the horizontal synchronization signal of the received television signal is determined to be below the threshold amplitude level, the horizontal synchronization signal processor causes the horizontal synchronization signal detector to sample the television signal at a second location to generate a second horizontal synchronization signal, and adaptively processes the second horizontal synchronization signal to determine a second quality measure by comparing the amplitude of the second horizontal synchronization signal with the threshold amplitude level, and enables or disables the display of the received television signal in response to the second quality measure.

4. The apparatus of claim 3, further comprising
the horizontal synchronization signal detector generates a second horizontal synchronization signal at a second location that corresponds to about 10 ms following the location associated with the horizontal synchronization signal.

5. A method of processing a television signal comprising the steps of:
receiving a television signal from one of a plurality of signal source types, each of the plurality of signal source types being associated with a respective signal source and providing respective television signals;
sampling a horizontal synchronization signal at a first location in a video field of the television signal; and
processing the sample to determine a quality measure of the television signal using a predefined threshold and generating a display signal in response to the determined quality measure, wherein
the threshold is established in response to a signal source type of the television signal,
if the quality measure is less than a predefined threshold, re-sampling the horizontal synchronization signal at a second location in the video field, and
processing the sample to determine a second quality measure of the television signal.

6. The method of claim 5, wherein the re-sampling occurring at the second location corresponds an offset of 10 milliseconds from the first location.

7. The method of claim 5, further comprising:
blanking a video display if the second quality measure is less than a predefined threshold level.

8. The method of claim 7, further comprising:
if the second quality measure indicates a low signal strength, displaying a weak signal message on the video display.

9. The method of claim 5, wherein the predefined threshold is established in response to the type of source of the television signal selected from the group comprising cable television, over-the-air television, and playback devices.

10. The method of claim 9, wherein the predefined threshold is higher for digital video disk and video cassette recorders and lower for cable television signals and over-the-air broadcast television signals.

11. The method of claim 9, wherein the predefined threshold is lowered for videocassette recorders that are in fast forward or rewind mode.

12. The method of claim 5, further comprising classifying the quality measure as viewable, weak or faulty.

13. The method of claim 12, wherein a video signal that is classified as faulty is not displayed.

14. The method of claim 12, wherein a video signal that is classified as faulty causes an error message to be displayed.

15. A method of processing a television signal to determine the quality of the television signal for generating an acceptable picture, the method comprising the steps of:
receiving a selected television signal from one of a plurality of signal source types, each of the plurality of signal source types being associated with a respective signal source and providing respective television signals;
sampling the television signal to derive a horizontal synchronization component of the television signal; and
processing the horizontal synchronization component to determine a quality measure of the television signal and either enabling or disabling the display of the television signal in response to the quality measure, wherein
the processing step comprises adaptively processing the horizontal synchronization component to determine the quality measure of the television signal by comparing the amplitude of the horizontal synchronization component with a threshold amplitude level established in response to a signal source type of the received television signal.

* * * * *